US007685241B2

(12) United States Patent
Crawford et al.

(10) Patent No.: US 7,685,241 B2
(45) Date of Patent: Mar. 23, 2010

(54) MAPPING ONLINE SERVICE USER ID TO PORTAL USER ID

(75) Inventors: Lee Crawford, Los Altos, CA (US); John Cahill, Spring Lake Heights, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 623 days.

(21) Appl. No.: 11/383,177

(22) Filed: May 12, 2006

(65) Prior Publication Data

US 2006/0258417 A1 Nov. 16, 2006

Related U.S. Application Data

(60) Provisional application No. 60/680,701, filed on May 13, 2005.

(51) Int. Cl.
*G06F 15/16* (2006.01)
(52) U.S. Cl. ........................ 709/206; 709/228
(58) Field of Classification Search ................ 709/227, 709/206, 228; 463/42
See application file for complete search history.

(56) References Cited

U.S. PATENT DOCUMENTS

| 5,771,353 | A  | * | 6/1998  | Eggleston et al. ........... 709/227 |
| 6,005,943 | A  | * | 12/1999 | Cohen et al. ................. 380/30 |
| 6,179,713 | B1 | * | 1/2001  | James et al. .................. 463/42 |
| 6,466,969 | B1 | * | 10/2002 | Bunney et al. .............. 709/206 |
| 6,699,125 | B2 | * | 3/2004  | Kirmse et al. ................. 463/42 |
| 6,898,187 | B2 | * | 5/2005  | Perlman et al. .............. 370/252 |
| 6,979,267 | B2 | * | 12/2005 | Leen et al. .................... 463/42 |
| 7,167,910 | B2 | * | 1/2007  | Farnham et al. ............. 709/223 |
| 7,240,093 | B1 | * | 7/2007  | Danieli et al. ................ 709/205 |
| 7,517,282 | B1 | * | 4/2009  | Pryor ........................... 463/42 |
| 2003/0153373 | A1 | * | 8/2003 | Squibbs .......................... 463/1 |
| 2004/0097287 | A1 | * | 5/2004 | Postrel ......................... 463/41 |
| 2004/0128250 | A1 |   | 7/2004 | Fox et al. |
| 2006/0258461 | A1 | * | 11/2006 | Bekman et al. .............. 463/42 |
| 2007/0077994 | A1 | * | 4/2007 | Betteridge .................... 463/42 |
| 2007/0162300 | A1 | * | 7/2007 | Roever et al. .................. 705/1 |
| 2007/0226307 | A1 | * | 9/2007 | Bae et al. ..................... 709/206 |
| 2008/0261689 | A1 | * | 10/2008 | Evans et al. ................... 463/29 |

* cited by examiner

*Primary Examiner*—Salad Abdullahi
*Assistant Examiner*—Sargon N Nano
(74) *Attorney, Agent, or Firm*—Darby & Darby P.C.; John W. Branch

(57) ABSTRACT

A system and method are directed towards mapping a first user ID, such as an alias game ID, which may be used by multiple users, to a second user ID, such as a portal messenger ID. A user registers with an intermediary service, such as a game data aggregation service, and provides both the first user ID and the second user ID. The aggregation service detects when the first user ID is being used by one or more users in a first service, such as an online game service. The aggregation service also detects when a client probe reports to a second service, such as a portal messenger service, that the second user ID is participating in the same service. The aggregation service determines whether one instance of the first user ID from the first service corresponds to the second user ID from the second service.

15 Claims, 6 Drawing Sheets

MAPPING ONLINE SERVICE USER ID TO PORTAL USER ID

CROSS-REFERENCE TO RELATED APPLICATIONS

This application claims the benefit of U.S. Provisional Application, titled "Mapping Online Service User ID to Portal User ID," Ser. No. 60/680,701 filed on May 13, 2005, the benefit of the earlier filing date of which is hereby claimed under 35 U.S.C. § 119(e), and further is incorporated by reference.

FIELD OF THE INVENTION

The present invention relates generally to multi-person online services, and more particularly, but not exclusively, to determining that an online service user identification is associated with a portal user identification.

BACKGROUND OF THE INVENTION

Online multiplayer games and other collaboration services have become increasingly popular as network communications have improved. Users who may be geographically distant from each other may communicate with an online service to participate together in games and/or other collaboration services. Typically, users run a client program that performs local processing and communicates with the online service to coordinate joint state of the multi-user game or service. For users to initiate participation in the same online game or online service, users may meet in an online lobby or other matching system that is associated with the online game or online service. However, if a person is not already communicating with the same lobby, or already participating in the same online service, the person may not be aware that a friend or colleague is participating. The friend or colleague can manually telephone the person or send a message with an identifier to invite the person to participate in the same online game or service. To reach people outside of the online game service, a message is typically sent through an independent messaging service, such as an online portal email service or instant message service, which is generally not limited to registered users of the online game service. However, this out-of-band messaging may be time consuming to find contact information and may distract from a current game session or other service session.

Without some out-of-band communication, it may also be difficult to confirm the identity of a player in the online game service. Many players use an alias while participating in the online game service. Some players may use the same alias as other players, which can affect the reliability of rating information that is provided by game monitoring services, which track participants in online game services.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment, an entirely hardware embodiment or an embodiment combining software and hardware aspects. The following detailed description is, therefore, not to be taken in a limiting sense. Briefly stated, the present invention is directed towards detecting execution of a program on a client and notifying other related clients that wish to interact with the first client. Although the invention is not so limited, an exemplary embodiment is described below in terms of a client executing a game program to participate in an online game system, and informing other clients through an instant message system that is not directly associated with the online game system.

Illustrative Operating Environment

Figure 1:
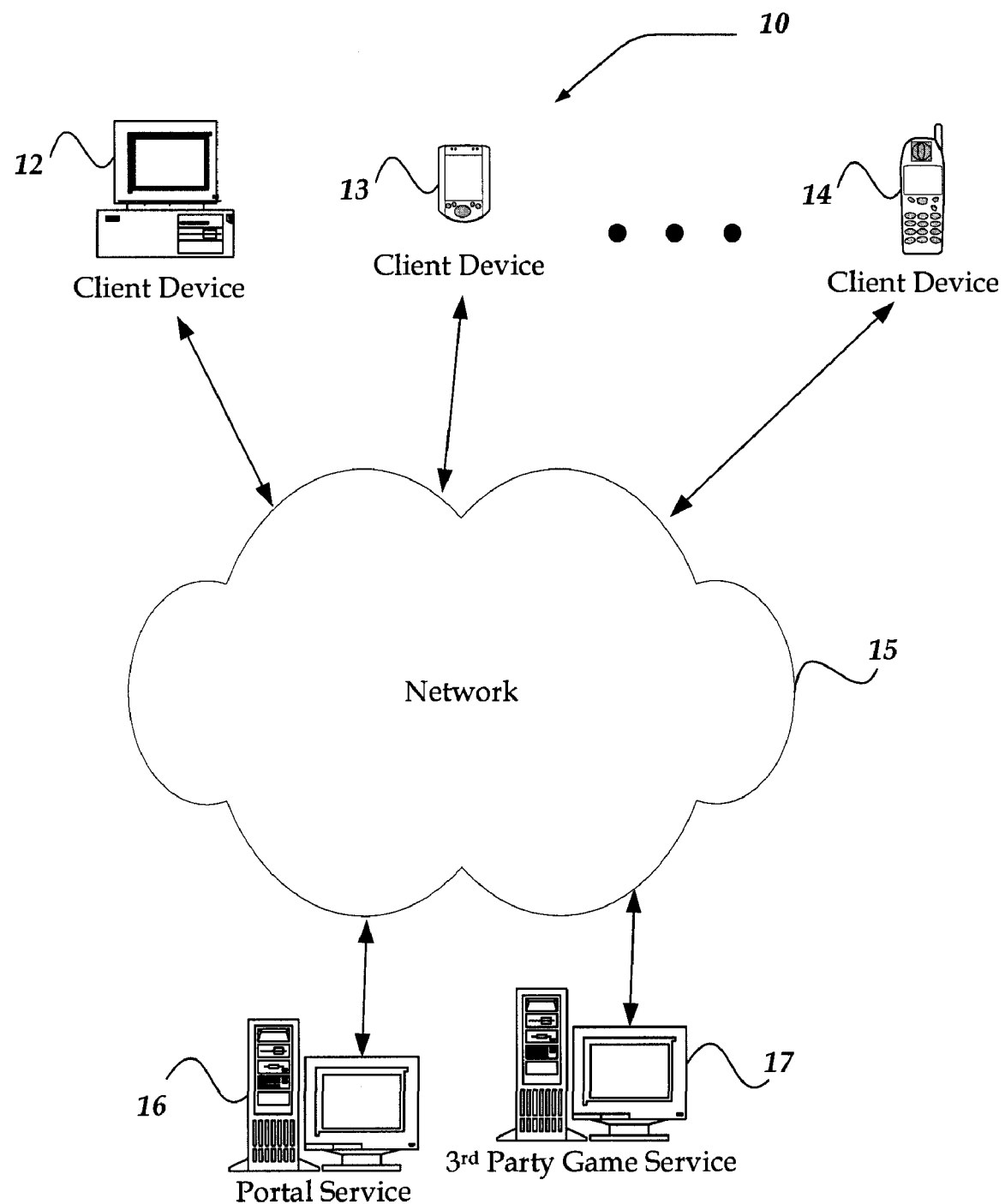
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, a portal service 16, and a third party game service 17 that is not directly associated with the portal service. Network 15 is in communication with and enables communication between each of client devices 12-14, portal service 16, and game service 17.

Client devices 12-14 may include virtually any computing device capable of receiving and sending a message over a network, such as network 15, to and from another computing device, such as portal service 16, each other, and the like. The set of such devices may include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. The set of such devices may also include devices that are usually considered more general purpose devices and typically connect using a wired communications medium such as personal computers, multiprocessor systems, microprocessor-based or programmable consumer electronics, network PCs, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to control settings, such as presence settings, and to instruct the client device to perform operations. Each client device also includes a communication interface that enables the client device to send and receive messages from another computing device employing the same or a different communication mode, including, but not limited to instant messaging (IM), email, short message service (SMS) messaging, multi-media message service (MMS) messaging, internet relay chat (IRC), Mardam-Bey's internet relay chat (mIRC), Jabber, and the like. Client devices 12-14 may be further configured with a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like.

Network 15 is configured to couple one computing device to another computing device to enable them to communicate. Network 15 is enabled to employ any form of medium for communicating information from one electronic device to another. Also, network 15 may include a wireless interface, such as a cellular network interface, and/or a wired interface, such as an Internet interface, in addition to an interface to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Integrated Services Digital Networks (ISDNs), Digital Subscriber Lines (DSLs), wireless links including satellite links, or other communications links that are equivalent and/or known to those skilled in the art. Furthermore, remote computers and other related electronic devices could be remotely connected to either LANs or WANs via a modem and temporary telephone link. In essence, network 15 includes any communication method by which information may travel between client devices 12-14, portal service 16, and/or game service 17. Network 15 is constructed for use with various communication protocols including transmission control protocol/internet protocol (TCP/IP), WAP, code division multiple access (CDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of a general purpose computing device, such as a client device 20, is described in more detail below in conjunction with FIG. 2. Briefly, client device 20 may include any computing device capable of connecting to network 15 to enable a user to communicate with other client devices, portal server 16, game service 17, and/or other devices. Client device 20 may include many more components than those shown. The components shown, however, are sufficient to disclose an illustrative embodiment for practicing the invention. Many of the components of client device 20 may also be duplicated in a server of portal service 16, a server of game service 17, and/or other server devices.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX, LINUX™, or the like. The operating system may also include, or interface with a virtual machine module that enables control of hardware components and/or operating system operations via application programs.

Mass memory 24 further includes one or more data storage units 32, which can be utilized by client device 20 to store, among other things, programs 34 and/or other data. Programs 34 may include computer executable instructions which can be executed by client device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

In addition, mass memory 24 stores one or more programs for messaging, gaming and/or other applications. A messaging client module 36 may include computer executable instructions, which may be run under control of operating system 31 to enable instant messaging, SMS, e-mail, and/or other messaging services. Similarly, a server device configured much like client device 20 (and/or client device 20 itself) may include a messaging server module 37, which provides routing, access control, and/or other server-side messaging services. Client device 20 may further include a game 38, which interacts with an online game service to enable client device 20 to participate in an online game. A game probe 39 may further detect execution of game 38 and notify other clients through messaging client 36 and/or messaging server 37. A server device configured much like client device 20 (and/or client device 20 itself) may include a monitoring module (not shown) that monitors activity of online game services. The same server, or a different server may include a data warehouse module (not shown) that collects, analyzes, and stores aggregated information regarding the online game services.

Figure 2:
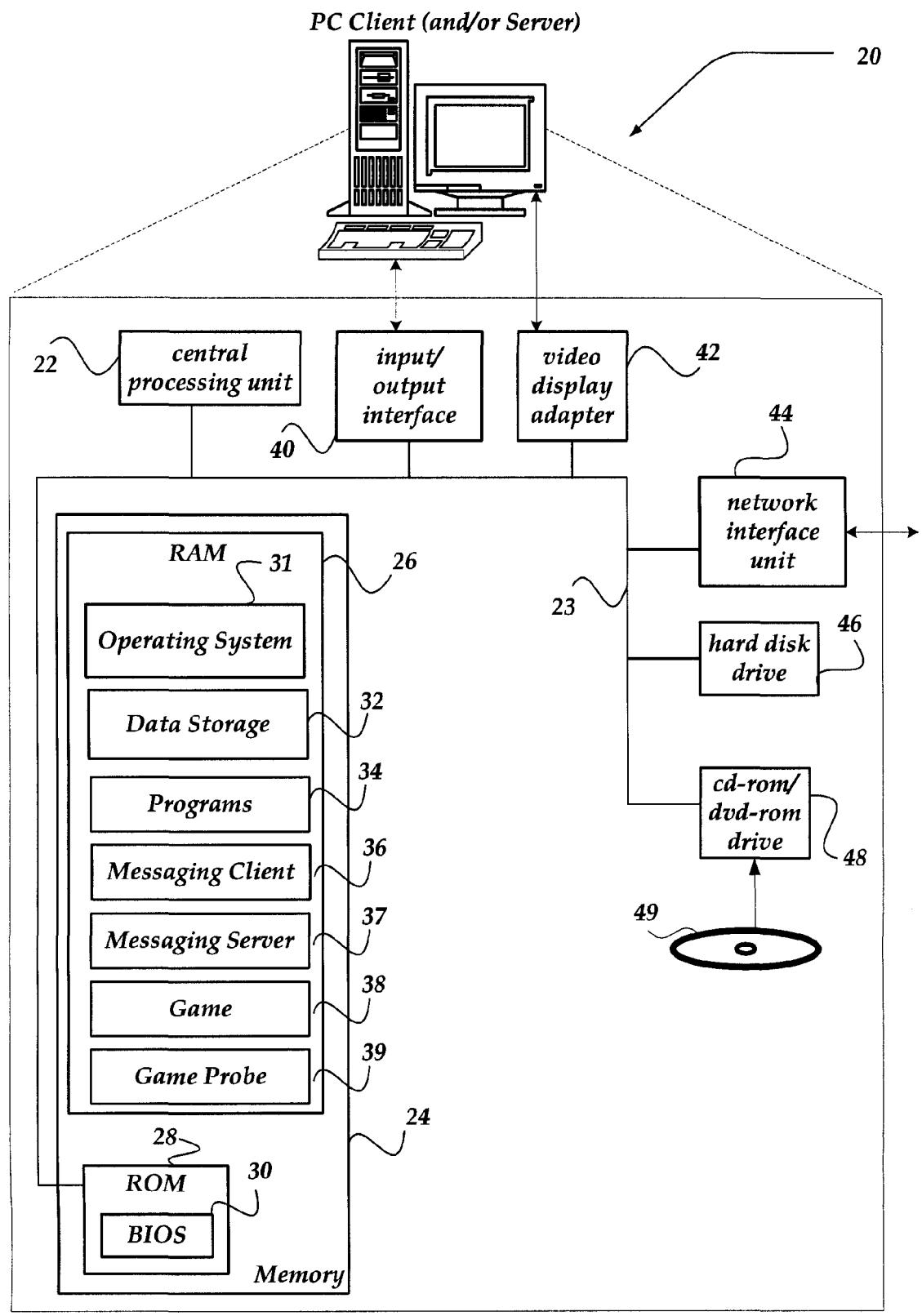
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31 and/or programs 34-39. Interaction with the user interface includes visual interaction via a display, and a video display adapter 42.

For higher capability client devices such as a personal computer, client device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 49, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 44, client device 20 can communicate with a wide area network such as the Internet, a local area network, a wired telephone network, a cellular telephone network, or some other communications network, such as network 15 in FIG. 1. Network communication interface unit 44 is sometimes known as a transceiver, transceiving device, network interface card (NIC), and the like.

Exemplary Program Detection and Notification

Figure 3:
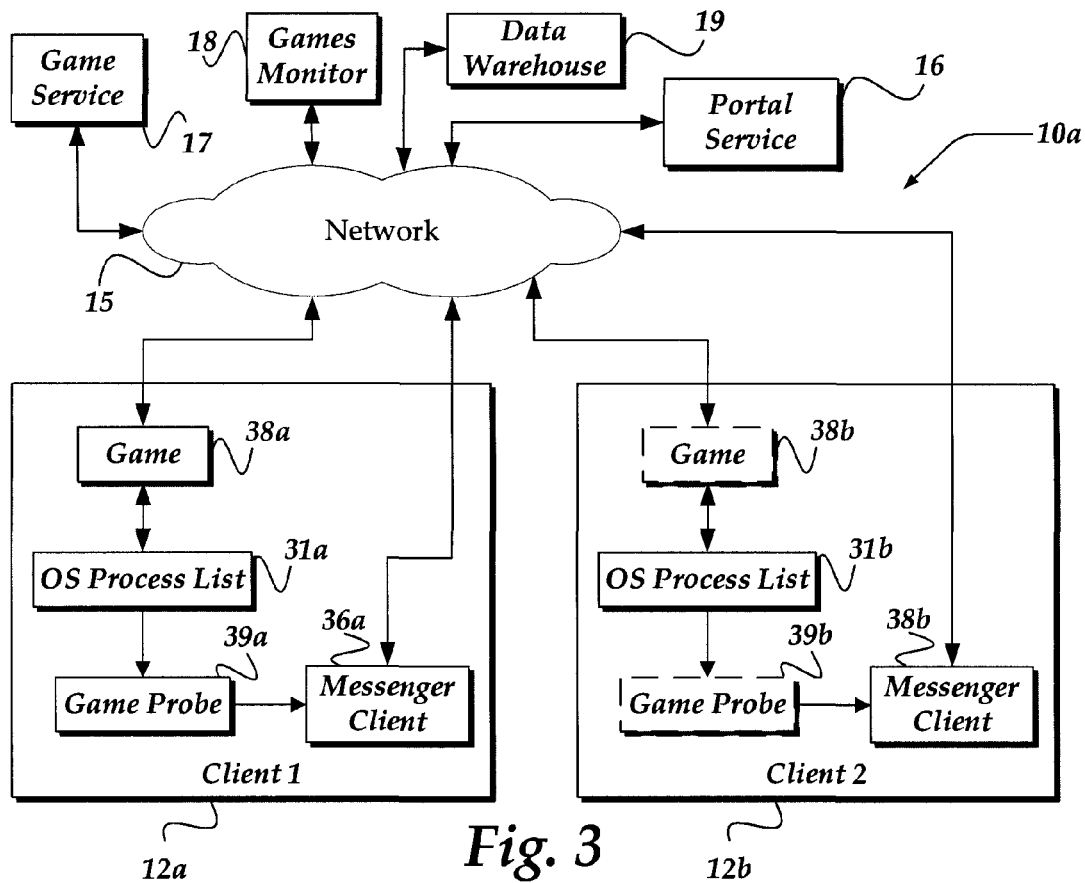
FIG. 3 illustrates one embodiment of an architecture for the present invention.

FIG. 3 illustrates one embodiment of an architecture 10a for the present invention. However, not all of the illustrated modules may be required to practice the invention, and variations in the arrangement and type of the components may be made without departing from the spirit or scope of the invention.

As shown in the figure, a first client 12a includes a game 38a that may communicate through network 15 and interface with game service 17 to participate in an online, multiplayer game. A games monitor 18 also communicates through network 15 with game service 17 and/or other game services to determine which online games and/or other programs are available. Games monitor 18 may also monitor a changing status of the games and/or other programs. Games monitor 18 may be independent of portal service 16 and game service 17. Alternatively, games monitor 18 may be hosted on a server of portal service 16, game service 17, or another related service. An example, of a games monitor is an All Seeing Eye™ (ASE) server that detects new games, monitors loading on numerous games servers, matches clients for play, and performs other services. In particular, games monitor 18 provides executable process names and status information through network 15 to portal service 16 and/or to clients. Games monitor 18 may provide information services related to a wide variety of games and games providers. Accordingly, games monitor 18 may comprise a collection of monitors that may or may not be directly associated with particular games and/or game services.

Similarly, a data warehouse 19 also communicates through network 15 with game monitor 18 and/or other services to collect, analyze, and store aggregate information. Data warehouse 19 may also communicate with portal service 16 to monitor messages from clients regarding games services and/or other services. Data warehouse 19 may be independent of portal service 16, game service 17, and games monitor 18. Alternatively, data warehouse 19 may be hosted on a server of portal service 16, game service 17, games monitor 18, or another related service.

While first client 12a executes game 38a as an application program process, the corresponding process name is listed in an operating system process list 31a. A game probe 39a monitors operating system process list 31a to detect when game 38a and/or other predetermined programs are executing. When game probe 39a detects executing game 38a, the game probe instructs a messenger client 36a to inform portal service 16 that first client 12a is participating in the online game. The game probe also instructs the messenger client to request that portal service 16 notify other clients that first client 12a is participating in the online game. The other clients are generally members of a contact list associated with first client 12a. The contact list may comprise contacts in an instant messenger list, an email address book, and/or other collections of communication contacts. First client 12a and/or portal service 16 may store the contact list. Some contacts may be obtained from game service 17, however the contact list is not limited to members of game service 17. Portal service 16 is also generally independent of game service 17, which might be limited to a single game, or a small subset of programs. Although portal service 16 may include one or more game services, portal service 16 need not be directly related to, or controlled by game service 17. Instead, portal service 16 may act as an intermediary between a wide variety of game services, enabling clients to interact beyond the boundaries of an particular game service.

For example, portal service 16 can communicate the notification through network 15 to a messenger client 38b of a second client 12b who may, or may not be a current member of game service 17. The notification can be displayed and/or otherwise provided to a user of second client 12b, who may choose to download and/or execute a game 38b and participate in the online multiplayer game with the user of first client 12a. If the user of second client 12b executes game 38b, the corresponding process name will be added to an operating system process list 31b. If second client 12b includes a game probe 39b, it can instruct messenger client 38b to notify first client 12a and/or other clients that second client 12b is also participating in the online multiplayer game.

Figure 4:
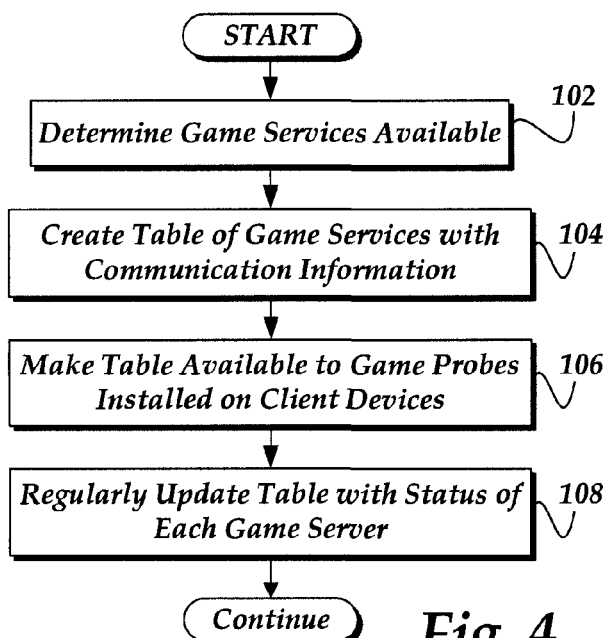
FIG. 4 is a flow diagram illustrating exemplary logic for one embodiment of a games monitor to provide a listing and status of currently available games.

FIG. 4 is a flow diagram illustrating exemplary logic for one embodiment of a games monitor to provide a listing and status of currently available games. At an operation 102, the games monitor determines which games and/or other programs are available from one or more game services and/or other services. The games monitor may obtain information from program publishers, program developers, users, reviewers, and the like. On a periodic basis, such as each day, the games monitor updates a configuration data file (e.g., config-.dat), with the name and other information about any new program executable files that have become available. At an operation 104, the games monitor creates a table of game services (and/or other services). The table includes communication information, such as a network address(es), port(s), protocol requirements, and the like. A sample table is illustrated in Table 1 below:

TABLE 1

| Program Name | File Name | Server Address | Port No. | No. of Messages | Time Period | Status |
|---|---|---|---|---|---|---|
| Half Life 2 | HL2.exe | 123.456.789.101 | 80 | 10 | 1 sec. | 98% |
| Half Life 2 | HL2.exe | 963.852.741.951 | 80 | 10 | 1 sec. | 53% |
| Quake 3 | Q3D.exe | 101.987.654.321 | 60 | 20 | 1.5 sec. | 84% |
| Sims | Sims.exe | 147.258.369.741 | 40 | 10 | .5 sec. | 46% |

The table may also include information that the game probe may use to determine whether the game is truly an online game in which other clients can participate. For example, the table may include information on communication traffic that would indicate an executing game is interacting with the online game service. Such information may include a number of messages that typically pass between the game service and the client within a specified time period.

At an operation 106, the games monitor makes the table available to game probes that are installed on clients. Each game probe may check for and download the table upon initiation of the game probe. Alternatively, the games monitor may push the table down to clients that are known to have a game probe installed. At an operation 108, the games monitor regularly updates the table with a current status of each game server. The status information may be used by newly initiated game probes to determine which game server(s) may be better to connect with and/or determine whether sufficient resources are available on a game server on which a friend is playing.

Figure 5:
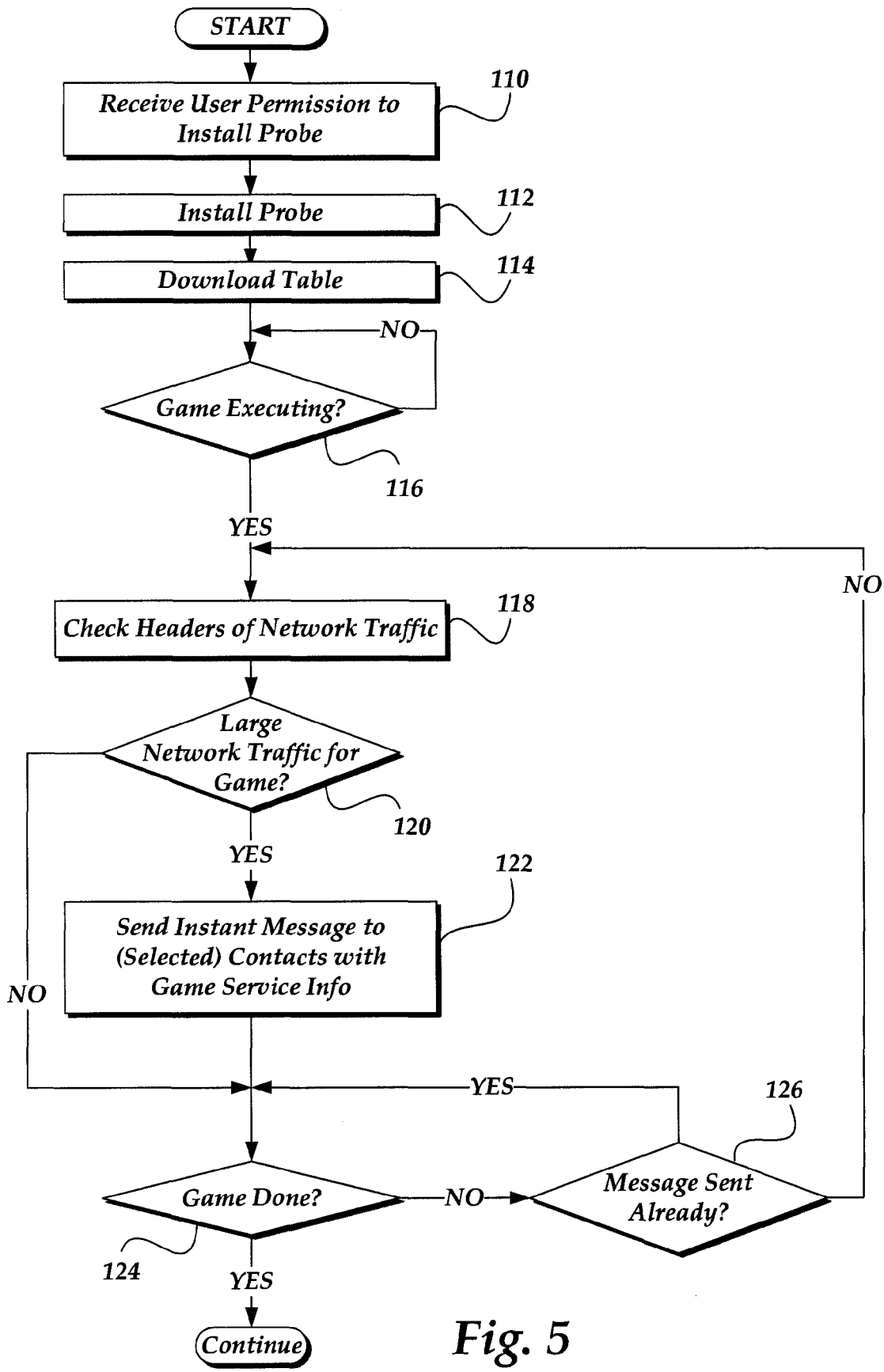
FIG. 5 is a flow diagram illustrating exemplary logic for one embodiment of a game probe to detect execution of a game program and notify another client.

FIG. 5 is a flow diagram illustrating exemplary logic for one embodiment of a game probe to detect execution of a game program and notify another client. At an operation 110, a client device receives permission to install the game probe. Permission may be provided when the client requests the game probe, when the game probe initiates its installation process, and/or at another suitable time. At an operation 112, the game probe is installed on the client device. The game probe contacts the games monitor and downloads the current table of game services at an operation 114.

At a decision operation 116, the game probe monitors the operating system process list for filenames of predefined executable files corresponding to games and/or other application programs that are listed in the table. If the game probe does not detect one the predefined executable files, the game probe continues to monitor the process list. The game probe may wait that have predefined or selectable intervals, such as every 15 seconds, to check for any of the predefined executable files. Once the game probe detects a predefined executable file in the process list, the game probe checks headers of communication traffic associated with the predefined executable file, at an operation 118. The game probe may check to see whether most the communication traffic is with the same game server, on the same port, and/or other communication characteristics. At a decision operation 120, the game probe determines whether a large amount of communication traffic is associated with the predefined executable file. For example, the game probe may detect whether a certain number of user datagram protocol (UDP) messages have been exchanged with the same game server within a specific time period. The number of messages and time period are generally provided in the table. However, the threshold number of messages and time period may depend on communication optimizations for each game, game servers, and/or other aspects.

If the communication traffic indicates that the client is communicating with an online game service, the game probe instructs the messenger client to send an instant message to one or more contacts, at an operation 122. The client user may preselect contacts to which a message should be sent and/or predefine other limitations on sending messages related to execution of the predefined program(s). The instant message may include information associated with the game service, so that contacts may communicate with the same game service. This provides an automated way to invite friends to participate in an online game and/or other services. The message may be sent directly to contacts based on information stored on the client. Alternatively, or in addition, the message may be communicated to a portal service which may distribute the message to other clients based on an address book and/or other contact information stored by the portal service. Conversely, if the communication traffic indicates that the client is not communicating with an online game service, but instead may be playing the game only locally, no message is sent.

And decision operation 124, the game probe detects whether the predefined executable file is still executing as indicated by the process list. If the game is still executing, the game probe determines, at a decision operation 126, whether a messages already been sent. If a message has already been sent, the game probe continues to monitor the process list to detect delisting of the predefined executable file. However, if a message was not previously sent control returns to operation 118 to continue to monitor communication traffic related to the predefined executable file. If the game has ended, the predefined executable file will no longer be listed, and the game probe can return to detecting and/or monitoring any other predefined executable files.

Figure 6:
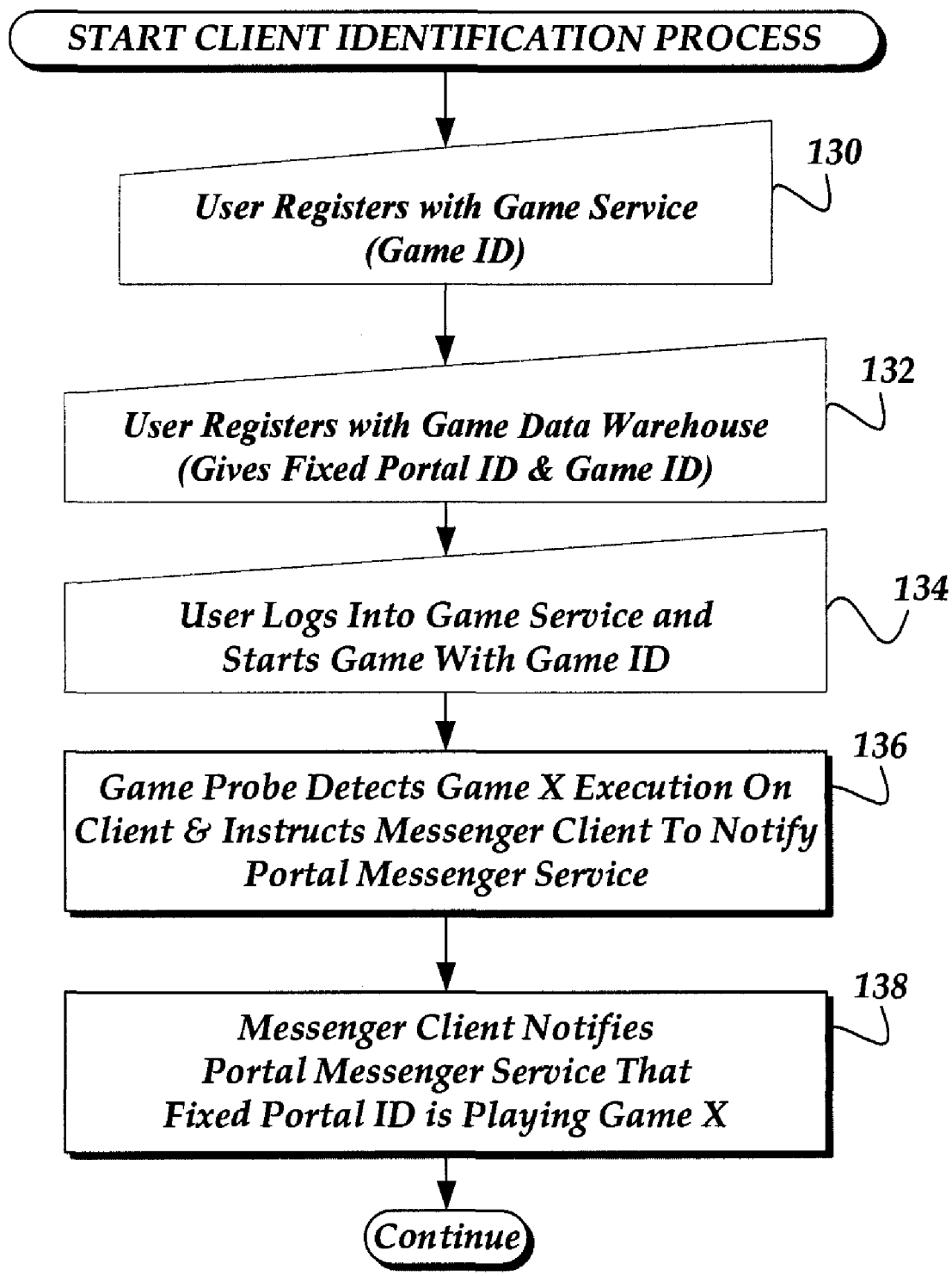
FIG. 6 is a flow diagram illustrating exemplary logic for one embodiment of a client process for providing identification information.

FIG. 6 is a flow diagram illustrating exemplary logic for one embodiment of a client process for providing identification information. At an operation 130, a user registers with the game service and selects a game ID to use. The game ID may correspond to a game service registration ID that identifies the user to the game service. A fixed ID may comprise a login ID, user name, or other fixed identification. In many cases, the game ID may comprise an alias that the user presents to other game participants to conceal the user's true identity.

At an operation 132, the user also registers with any game data warehouse, which may be a premium subscription service of the portal service, game service, or other service. The user provides the data warehouse with the user's portal ID and with the user's game ID. Again, the game ID may be an alias used while interacting with other participants in the game service. The user may, or may not provide the data warehouse with the user's game service registration ID. In many cases the user will not provide the game service registration ID to the data warehouse, so that the game service registration ID remains securely known only to the game service. Similarly, the user may provide the data warehouse with only an alias messaging ID rather than a portal service registration ID. The alias messaging ID can then be associated with the alias game ID. However, the embodiment described herein has the data warehouse associate the alias game ID with the user's portal registration ID, which identifies the sender of messages from the client to the portal service messaging system. The data warehouse may certify the identity and game performance of a portal service user that participates in the game service under an alias game name.

Hence, at an operation 134, the client user logs into the game service and starts interacting with the online game service via the client game module. The user will generally log into the game service with the game service registration ID and use the alias game ID during game play. At an operation 136, the game probe detects execution of the client game module and confirms that the client is interacting with the game service. The game probe than instructs the messenger client to notify the portal service that the client is participating in a particular online game. Accordingly, at an operation 138, the messenger client sends an instant message to the portal messenger server. The instant message includes user's portal ID, the name of the game being played, an address to the game server, and other relevant information. The portal service is then aware that the portal ID is currently associated with a particular online game on a particular server.

Figure 7:
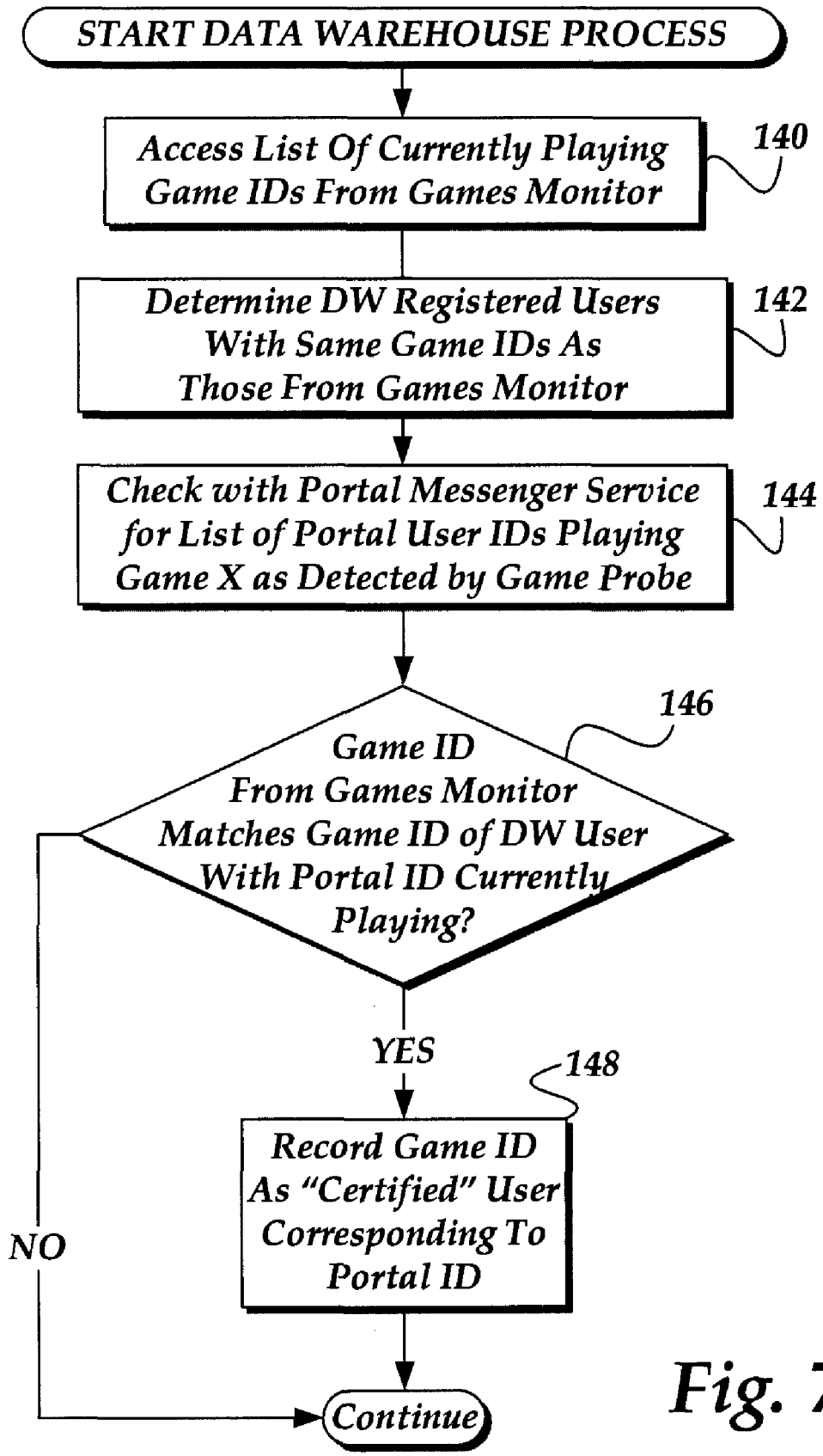
FIG. 7 is a flow diagram illustrating exemplary logic for one embodiment of a data warehouse that validates a game service identification (ID) as corresponding to a portal ID.

FIG. 7 is a flow diagram illustrating exemplary logic for one embodiment of a data warehouse that validates a game ID as corresponding to a portal ID. At an operation 140, the data warehouse accesses the games monitor to obtain a list of game IDs that are currently participating in game services and/or other online services. And one embodiment, the data warehouse may periodically access the games monitor. Alternatively, the games monitor and/or game services may push information to the data warehouse. The list of game IDs may be sorted by game service, by game, by game server, and/or other criteria. At an operation 142, the data warehouse checks its own list of registered users for those that are associated with game IDs obtained from the games monitor. As indicated above, the list of users registered with the data warehouse may be identified by a data warehouse ID, fixed portal ID, alias portal ID, alias messenger ID, or other identifier. In the present exemplary embodiment, a user registers with the data warehouse using a fixed portal ID that also identifies the user in instant messages. Thus, the data warehouse has a list of game IDs that may correspond to registered portal IDs. However, there may be multiple users with the same game IDs. Consequently, it may not be clear whether the game IDs obtained from the games monitor truly corresponds to register portal IDs, or which one of the same game ID corresponds to a registered portal ID.

To crosscheck, the data warehouse accesses the portal messenger service at an operation 144 for a list of fixed portal IDs reported by client game probes as participating in a game service. The data warehouse may poll the portal messenger service or receive notices from the portal messenger service whenever a game probe identifies a client participating in a game. The data warehouse may also sort the fixed portal IDs by game, game server address, and/or other criteria. At a decision operation 146, the data warehouse determines whether one of the game IDs from the games monitor matches a game ID provided by a registered user of the data warehouse, and the portal ID of that registered user was reported to the portal messenger service as participating in the same game. The data warehouse may also check for matching game server addresses and/or other matching criteria. If a match is not found, a game ID from the games monitor does not correspond to a registered user of the data warehouse. However, if a match is found, the data warehouse records the game ID at an operation 148, indicating that the data warehouse certifies the game ID game ID as corresponding to the fixed portal ID of a registered data warehouse user. The data warehouse may also notify the game service, the games monitor, the portal service, the client associated with the fixed portal ID, and/or other services.

The above specification, examples, and data provide a complete description of the manufacture and use of the composition of the invention. However other embodiments will be clear to one skilled in the art. For example, the client probe may detect any type of predetermined process being executed on a client, besides games, and notify the portal service. The data warehouse can check other monitors services and/or the online services directly to determine alias IDs that correspond to registered portal IDs. Since many embodiments of the invention can be made without departing from the spirit and scope of the invention, the invention resides in the claims hereinafter appended.

What is claimed as new and desired to be protected by Letters Patent of the United States is:

1. A method for mapping a first user identification (ID) to a second user ID between separate online services, comprising:

storing an association between the first user ID of a user and the second user ID of the same user;

accessing a monitor service that monitors at least a first online service and is independent of each monitored online service, wherein the first online service comprises an online name service, wherein the first user ID comprises an alias that is associated with a fixed ID registered with the first online service, and wherein the fixed ID is not equivalent to the second user ID;

determining from the monitor service that the first user ID is actively participating in the first online service;

accessing a second online service that receives a message from a client identified by the second user ID, wherein the message indicates that the client detected the second user ID actively participating in the first online service, wherein the second online service comprises an online portal service that is independent of the online game service and the online portal service provides a messaging service, and wherein the second user ID is registered with the online portal service, but the second user ID is not registered with the online game service; and determining from the association that the first user ID corresponds to the client identified by the second user ID.

2. The method of claim 1, wherein the first online service is remote from the second online service, and the monitor service provides participation information about users of the first online service, wherein the participation information can be aggregated in a data warehouse for use by registered members of the second online service that is independent from the first online service.

3. The method of claim 1, wherein accessing the second online service comprises one of:
periodically requesting an update from the second online service for the message from the client; and
receiving a notice from the second online service that the message was received from the client.

4. The method of claim 1, wherein the message is received by the second online service from the client when the client detects execution of a client program that interacts with the first online service.

5. The method of claim 1, wherein the message comprises an instant message and the second online service includes an instant messenger service.

6. The method of claim 1, further comprising storing an indication that the second user ID is certified as having participated in the first online service.

7. The method of claim 1, wherein storing the association comprises receiving an indication from the client that the first user ID is associated with the second user ID.

8. The method of claim 1, wherein the message also indicates one of a plurality of addresses associated with the first online service and the monitor service indicates that the first user ID is actively participating in the first online service at the one of the plurality of addresses.

9. A computer readable storage medium, comprising processor executable instructions that when executed by a processor perform actions, including:
storing, with the processor, an association between a first user ID of a user and a second user ID of the same user;
accessing a monitor service that monitors at least a first online service and is independent of each monitored online service, wherein the first online service comprises an online name service, wherein the first user ID comprises an alias that is associated with a fixed ID registered with the first online game, and wherein the fixed ID is not equivalent to the second user ID;
determining from the monitor service that the first user ID is actively participating in the first online service;
accessing a second online service that receives a message from a client identified by the second user ID, wherein the message indicates that the client detected the second user ID actively participating in the first online service, wherein the second online service comprises an online portal service that is independent of the online game service and the online portal service provides a messaging service, and wherein the second user ID is registered with the online portal service, but the second user ID is not registered with the online name service; and
determining from the association that the first user ID corresponds to the client identified by the second user ID.

10. A server device for mapping a first user identification (ID) to a second user ID between separate online services, comprising:
a communication interface in communication with a monitor service and a second online service;
a memory for storing instructions; and
a processor in communication with the communication interface and with the memory, wherein the processor performs actions based at least in part on the stored instructions, including:
storing an association between the first user ID of a user and the second user ID of the same user;
accessing the monitor service that monitors at least a first online service and is independent of each monitored online service, wherein the first online service comprises an online name service, wherein the first user ID comprises an alias that is associated with a fixed ID registered with the first online service, and wherein the fixed ID is not equivalent to the second user ID;
determining from the monitor service that the first user ID is actively participating in the first online service;
accessing the second online service that receives a message from a client identified by the second user ID, wherein the message indicates that the client detected the second user ID actively participating in the first online service, wherein the second online service comprises an online portal service that is independent of the online game service and the online portal service provides a messaging service, and wherein the second user ID is registered with the online portal service, but the second user ID is not registered with the online game service; and
determining from the association that the first user ID corresponds to the client identified by the second user ID.

11. The server device of claim 10, wherein the server device comprises a data warehouse that further communicates with the monitor service to obtain participation information about users of the first online service, and further aggregates the participation information for use by registered members of the second online service that is independent of the first online service.

12. The server device of claim 10, wherein the message is received by the second online service from the client when the client detects execution of a client program that interacts with the first online service.

13. The server device of claim 10, wherein the message also indicates one of a plurality of addresses associated with the first online service and the monitor service indicates that the first user ID is actively participating in the first online service at the one of the plurality of addresses.

14. The server device of claim 10, wherein the processor further performs the action of storing an indication that the second user ID is certified as having participated in the first online service.

15. A client device for mapping a first user identification (ID) to a second user ID between separate online services, comprising:
a communication interface in communication with a first online service, a second online service, and a data warehouse service, wherein the first online service comprises an online name service, wherein the first user ID comprises an alias that is associated with a fixed ID registered with the first online service, wherein the fixed ID is not equivalent to the second user ID, wherein the second online service comprises an online portal service that is independent of the online game service and the online portal service provides a messaging service, and wherein the second user ID is registered with the online portal service, but the second user ID is not registered with the online game service;
a memory for storing instructions; and a processor in communication with the communication interface and with the memory, wherein the processor performs actions based at least in part on the stored instructions, including:

providing to the data warehouse service an association between the first user ID of a user and the second user ID of the same user;

executing a client service that actively participates in the first online service with the first user ID;

using a client probe to monitor a client process list and the communication interface to determine that the client service is actively participating in the first online service; and communicating a message to the second online service using the second user ID, wherein the message notifies the second online service that the client service is executing, and the message includes an address to the first online service, but the message does not include a reference to the first user ID; and wherein:

the message is provided by the second online service to the data warehouse service such that that data warehouse service is notified that the second user ID is actively participating in the first online service:

the data warehouse service accesses a monitor service that monitors at least the first online service to determine that the first user ID is actively participating in the first online service and is independent of each monitored online service; and the data warehouse service determines that the first user ID corresponds to the client device identified by the second user ID.

* * * * *

UNITED STATES PATENT AND TRADEMARK OFFICE
CERTIFICATE OF CORRECTION

| | |
|---|---|
| PATENT NO. | : 7,685,241 B2 |
| APPLICATION NO. | : 11/383177 |
| DATED | : March 23, 2010 |
| INVENTOR(S) | : Lee Crawford et al. |

It is certified that error appears in the above-identified patent and that said Letters Patent is hereby corrected as shown below:

In column 10, line 52, in claim 1, delete "name" and insert -- game --, therefor.
In column 11, line 43, in claim 9, delete "name" and insert -- game --, therefor.
In column 11, line 58, in claim 9, delete "name" and insert -- game --, therefor.
In column 12, line 10, in claim 10, delete "name" and insert -- game --, therefor.
In column 12, line 57, in claim 15, delete "name" and insert -- game --, therefor.

Signed and Sealed this
Twenty-second Day of February, 2011

David J. Kappos
*Director of the United States Patent and Trademark Office*